(12) United States Patent
Zhou et al.

(10) Patent No.: US 11,808,355 B2
(45) Date of Patent: Nov. 7, 2023

(54) COOLANT REGULATOR HAVING A SHAFT SEAL

(71) Applicant: Schaeffler Technologies AG & Co. KG, Herzogenaurach (DE)

(72) Inventors: Huilan Zhou, Taicang (CN); Thomas Traudt, Pegnitz (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 8 days.

(21) Appl. No.: 17/640,108

(22) PCT Filed: Sep. 3, 2020

(86) PCT No.: PCT/DE2020/100770
§ 371 (c)(1),
(2) Date: Mar. 3, 2022

(87) PCT Pub. No.: WO2021/043372
PCT Pub. Date: Mar. 11, 2021

(65) Prior Publication Data
US 2022/0290760 A1 Sep. 15, 2022

(30) Foreign Application Priority Data
Sep. 4, 2019 (DE) .................. 10 2019 123 646.0

(51) Int. Cl.
*F16J 15/3236* (2016.01)
*F16J 15/3248* (2016.01)
*F16J 15/3268* (2016.01)

(52) U.S. Cl.
CPC ....... *F16J 15/3236* (2013.01); *F16J 15/3248* (2013.01); *F16J 15/3268* (2013.01)

(58) Field of Classification Search
CPC .... F16J 15/00; F16J 15/16; F16J 15/50; F16J 15/52; F16J 15/32; F16J 15/3204;
(Continued)

(56) References Cited

U.S. PATENT DOCUMENTS

2019/0085987 A1* 3/2019 Grosskopf .............. F16K 5/201

FOREIGN PATENT DOCUMENTS

DE          4434573        4/1996
DE       102014209122     11/2015
(Continued)

*Primary Examiner* — Nathan Cumar
(74) *Attorney, Agent, or Firm* — Volpe Koenig

(57) ABSTRACT

A coolant regulator is provided including a housing having a coolant chamber and a rotary vane arranged therein, a drive shaft leading out of the coolant chamber that rotates the rotary vane, and a shaft seal which seals the coolant chamber from the surroundings. The shaft seal seals against a housing inner lateral surface of a housing recess and sealingly encloses the drive shaft. An end portion of the shaft seal facing the rotary vane is a circular ring that, under elastic deformation of the bead thereof, seals against the housing inner lateral surface on the outer circumference and encompasses a spreading ring on the inner circumference that limits an axial shift of the shaft seal toward the rotary vane to a dimension d<s. s is the axial distance between the bead center of the undisplaced shaft seal and the opening of the housing recess facing the rotary vane.

10 Claims, 2 Drawing Sheets

(58) Field of Classification Search
CPC .. F16J 15/3232; F16J 15/3236; F16J 15/3248; F16J 15/3252; F16J 15/3256; F16J 15/326; F16J 15/3264; F16J 15/3268; F16J 15/3272; F16J 15/3276
USPC .......................................................... 277/573
See application file for complete search history.

(56) References Cited

FOREIGN PATENT DOCUMENTS

| | | |
|---|---|---|
| DE | 102014209127 | 11/2015 |
| DE | 102015216867 | 3/2017 |
| DE | 102015216867 A1 * | 3/2017 |
| DE | 102016203070 | 6/2017 |
| DE | 202018105090 | 9/2018 |
| DE | 202018105090 U1 * | 10/2018 |
| DE | 202018002099 | 2/2019 |
| DE | 202018002099 U1 * | 3/2019 |

* cited by examiner

COOLANT REGULATOR HAVING A SHAFT SEAL

CROSS-REFERENCE TO RELATED APPLICATIONS

This application is the U.S. National Phase of PCT Appln. No. PCT/DE2020/100770, filed Sep. 3, 2020, which claims priority from German Patent Application No. 10 2019 123 646.0, filed Sep. 4, 2019, the entire disclosures of which are incorporated by reference herein.

TECHNICAL FIELD

The disclosure relates to a coolant regulator, comprising: a housing having a coolant chamber, a rotary vane arranged in the coolant chamber, a drive shaft leading out of the coolant chamber, which rotates the rotary vane, and a shaft seal which is rotationally fixed relative to the housing and seals the coolant chamber from the surroundings of the coolant regulator, wherein the shaft seal is inserted so as to seal against a housing inner lateral surface of a housing recess and sealingly encloses the drive shaft.

BACKGROUND

A coolant regulator of this type is used in the cooling circuit of an internal combustion engine in the stepless distribution of the coolant flow over individual sub-circuits and is known, for example, from DE 10 2016 203 070 B3. Other coolant regulators with shaft seals or a shaft seal are known from DE 10 2014 209 122 A1, DE 10 2014 209 127 A1 and DE 44 34 573 A1.

If the cooling circuit is initially filled under vacuum, the pressure difference between the ambient pressure at the coolant regulator and the negative pressure within the evacuated cooling circuit acts on the end face of the shaft seal that faces away from the coolant chamber. Depending on the surface area, pressure difference and pressing force of the shaft seal, there is a risk that the pressure force corresponding to the pressure difference will shift the shaft seal in the direction of the rotary vane, so that in the worst case the operationally required sealing effect of the shaft seal against the housing inner lateral surface will be irreversibly lost.

SUMMARY

It is therefore the object of the disclosure to specify a coolant regulator having improved seal design.

This object is achieved in that an end portion of the shaft seal facing the rotary vane is a circular ring having a bead-shaped cross-section, which circular ring, under elastic deformation of the bead, seals against the housing inner lateral surface on the outer circumference a spreading ring on the inner circumference, which spreading ring, in order to limit an axial and directed toward the rotary vane, is opposite an axial shift of the shaft seal directed toward the rotary vane, is opposite an axial stop which limits the axial shift of the shaft seal to a dimension d<s, wherein the dimension s is the axial distance between the bead center of the undisplaced shaft seal and the opening of the housing recess facing the rotary vane.

The seal design according to the disclosure has the effect that the spreading ring on the one hand holds the bead in elastically deformed sealing contact with the housing inner lateral surface and on the other hand is a comparatively inelastic stop partner of the axial stop. The distance thereof from the spreading ring is dimensioned in such a way that when the coolant regulator is in an evacuated state, the pressure difference acting on the shaft seal cannot displace the shaft seal so far that the axial center of the bead leaves the opening of the housing recess and consequently loses the sealing contact with the housing inner lateral surface.

Advantageous embodiments are provided below and in the claims.

BRIEF DESCRIPTION OF THE DRAWINGS

A preferred embodiment of the disclosure is explained in more detail below with reference to the figures. In the figures.

DETAILED DESCRIPTION

Figure 1:
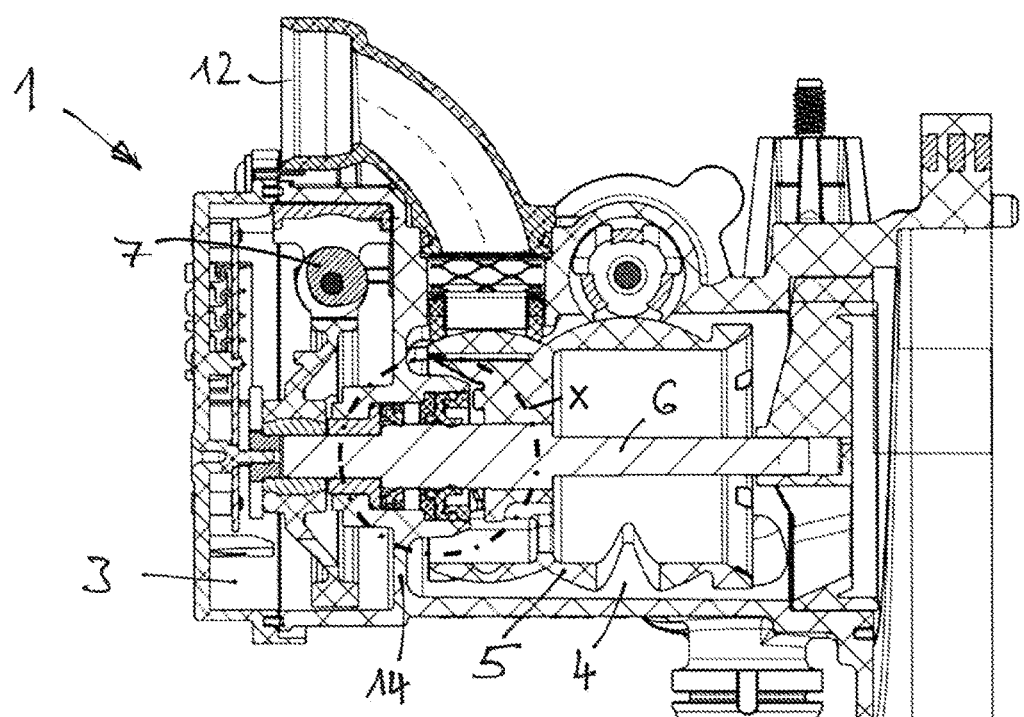
FIG. 1 shows a coolant regulator according to the disclosure in longitudinal section.

FIG. 1 shows a coolant controller 1 of a cooling circuit, which comprises several sub-circuits, of an internal combustion engine, not shown. The coolant regulator controls the coolant flow via the partial circuits in a manner known per se and has a housing 2 with a drive chamber 3 and a coolant chamber 4 separated therefrom, in which a rotary vane 5 is rotatably mounted. The rotation of the rotary vane 5 takes place steplessly via a drive shaft 6 fastened to the rotary vane 5, which is led out of the coolant chamber 4 and is connected to a rotary drive 7 arranged in the drive chamber 3.

Figure 3:
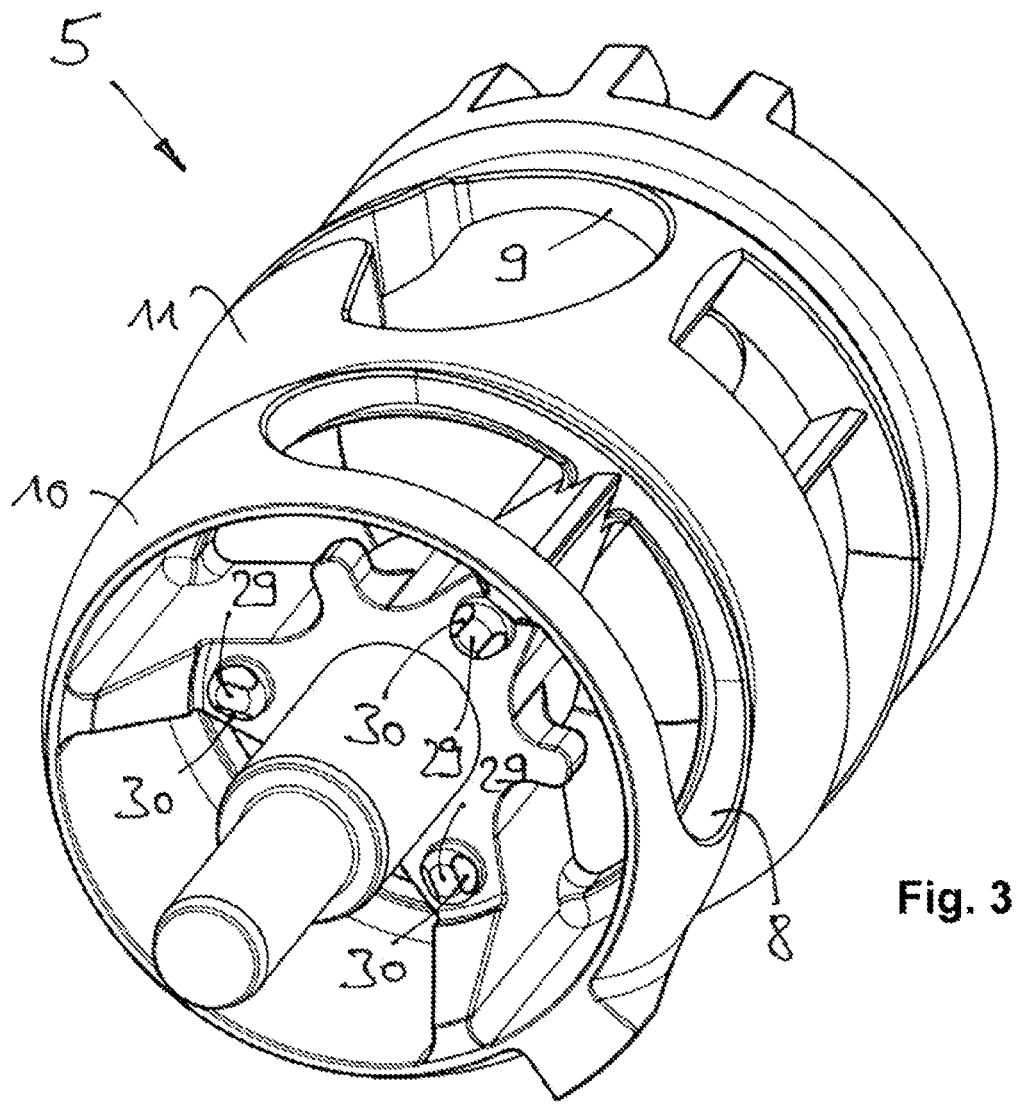
FIG. 3 shows the rotary vane of the coolant regulator in an isolated perspective view.

The rotary vane 5 shown in FIG. 3 has two radial flow openings 8 and 9, which pass through two sections 10 and 11 of the rotary vane 5 in the shape of spherical segments with a variable width around the circumference and control the coolant flow via connection pieces depending on its rotational position. Two of the connecting pieces are denoted by 12 and 13 in FIG. 1.

Figure 2:
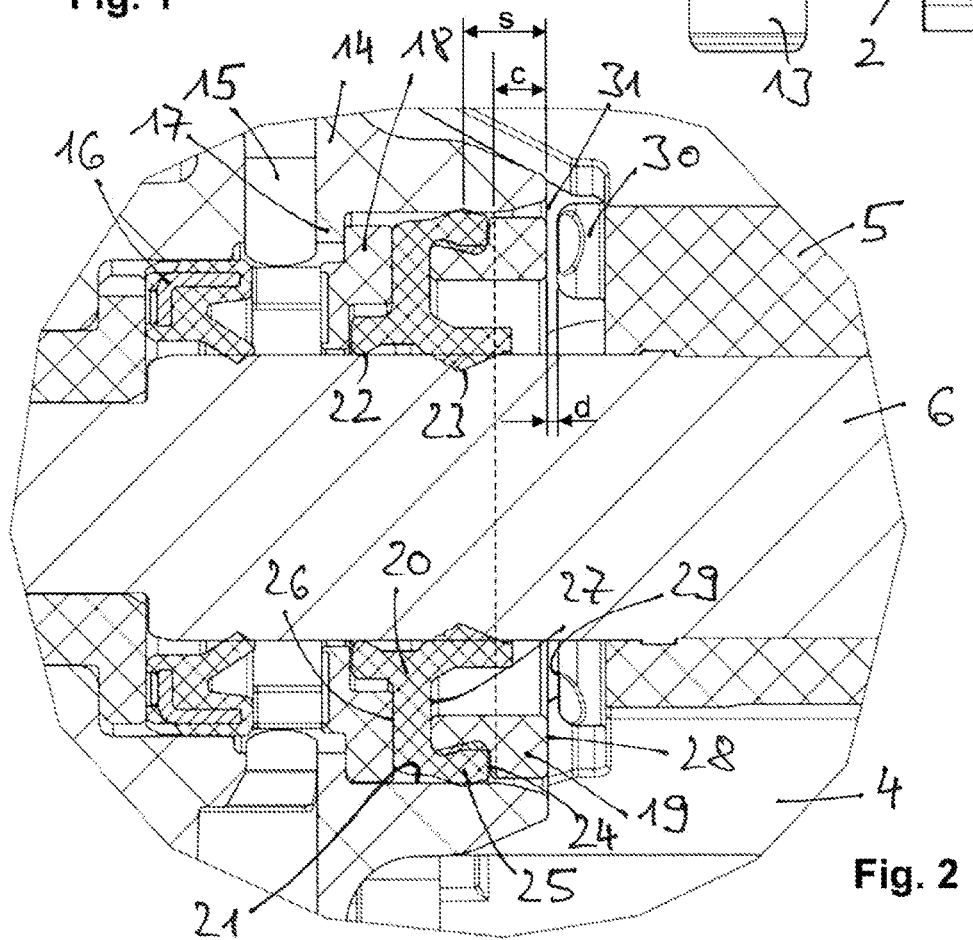
FIG. 2 shows the detail X according to FIG. 1.

As is clear when viewed together with FIG. 2, the drive chamber 3 and the coolant chamber 4 are separated from one another by a partition wall 14 of the housing 2. The drive shaft 6 is passed through the partition wall 14 and sealed on both sides of a leakage opening 15 connecting the shaft passage to the surroundings of the coolant regulator 1. The drive chamber 3 is sealed with a commercially available radial shaft seal 16 and the coolant chamber 4 is sealed with a specially adapted seal design from the surroundings of the coolant regulator 1. The special seal design comprises, in axial series connection, a support ring 18 abutting against a shoulder 17 of a housing recess on the side of the leakage opening 15, a spreading ring 19 on the side of the coolant chamber 4 and a shaft seal 20 made of elastomer material arranged between the supporting ring 18 and the spreading ring 19. The support ring 18 and the spreading ring 19 consist of a comparatively hard polymer material.

The shaft seal 20 is inserted so as to seal in a housing inner lateral surface 21 of the housing recess in a rotationally fixed and sealing manner, encloses the drive shaft 6 with two sealing lips 22 and 23 and, for the purpose of its sealing attachment in the housing inner lateral surface 21, has an end portion facing the rotary vane 5, which is a circular ring 24 designed with a bead-shaped cross-section. The circular ring 24 encompasses the inner circumference of the spreading ring 19 and seals with the outer circumference of the housing inner lateral surface 21 with elastic deformation of the bead

25. The shaft seal 20 is shown in FIGS. 1 and 2 without its elastic deformation caused by installation and consequently with overlaps with the housing inner lateral surface 21, with the drive shaft 6, and with the spreading ring 19. The same applies to the radial shaft seal 16.

The leakage opening 15 penetrating the housing 2 causes the ambient pressure of the coolant regulator 1 to prevail on the rear side 26 of the shaft seal 20 facing away from the rotary vane 5. When it is first installed in the cooling circuit of the internal combustion engine, the cooling circuit and consequently also the coolant chamber 4 are evacuated for the purpose of complete and rapid filling with coolant. The resulting pressure difference between the back 26 of the shaft seal 20 and its front side 27 (facing the rotary vane 5) can lead to a breakaway force on the bead 25 in relation to the housing inner lateral surface 21 being exceeded, and as a result the shaft seal 20 being displaced axially towards the rotary vane 5.

Despite the displacement of the sealing ring, and so as not to impair the sealing contact between the bead 25 and the housing inner lateral surface 21, the potential axial shift is limited to a dimension d. The limitation occurs in that the front side 28 of the spreading ring 19 facing the rotary vane 5 is opposite an axial stop 29 which is part of the rotary vane 5 and is formed here by three projections 30 circumferentially distributed on the rotary vane 5; see FIG. 3.

The axial shift is limited to the dimension d≤s shown, the dimension s being the axial distance between the bead center of the undisplaced shaft seal 20 and the opening 31 of the housing recess facing the rotary vane 5. This relationship initially means that when the shaft seal 20 is displaced, the axial bead center 25 never leaves the opening 31 and consequently its sealing contact with the housing inner lateral surface 21 remains even when the shaft seal 20 is displaced to the maximum.

In addition, in the present case, the axial shift is limited to the dimension d≤s−c, wherein the dimension c is the width of a section 32 of the housing inner lateral surface 21 that widens in diameter towards the rotary vane 5 between a cylindrical section 33 of the housing inner lateral surface 21 and the opening 31 of the housing recess. The dashed line in FIG. 2 marks the transition from the cylindrical section 33 to the widening section 32. This additional limitation of the axial shift has the effect that when the shaft seal 20 is displaced, the axial bead center never leaves the cylindrical section 33 and consequently the elastic deformation in the sealing contact of the bead 25 with the housing inner lateral surface 21 remains unchanged.

In an alternative embodiment that is not shown, the axial shift can be limited by means of a positive (snap) connection of the shaft seal 20 or the spreading ring 19, for example with a peripheral groove in the housing inner lateral surface 21.

REFERENCE SYMBOLS

1 Coolant regulator
2 Housing
3 Drive chamber
4 Coolant chamber
5 Rotary vane
6 Drive shaft
7 Rotary drive
8 Flow opening
9 Flow opening
10 Section
11 Section
12 Connecting piece
13 Connecting piece
14 Partition wall
15 Leakage opening
16 Radial shaft seal
17 Shoulder
18 Support ring
19 Spreading ring
20 Shaft seal
21 Housing inner lateral surface
22 Sealing lip
23 Sealing lip
24 Circular ring
25 Bead
26 Rear side
27 Front side
28 Front side
29 Axial stop
30 Projection
31 Opening
32 Section
33 Section

The invention claimed is:

1. A coolant regulator comprising:
a housing having a coolant chamber;
a rotary vane arranged in the coolant chamber;
a drive shaft leading out of the coolant and configured to rotate the rotary vane;
a shaft seal which is rotationally fixed relative to the housing and which seals the coolant chamber from surroundings of the coolant regulator;
the shaft seal being inserted so as to seal against a housing inner lateral surface of a housing recess and sealingly enclosing the drive shaft;
an end portion of the shaft seal facing the rotary vane is a circular ring having a bead-shaped cross-section, said circular ring, under elastic deformation of the bead, seals an outer circumference with the housing inner lateral surface and encompasses a spreading ring on an inner circumference; and
said spreading ring, in order to limit an axial shift of the shaft seal directed toward the rotary vane, is opposite an axial stop which limits the axial shift of the shaft seal to a dimension d≤s, wherein the dimension s is an axial distance between a bead center of the shaft seal in an undisplaced condition and an opening of the housing recess facing the rotary vane.

2. The coolant regulator according to claim 1, wherein the housing inner lateral surface has a cylindrical section, and the axial shift of the shaft seal is limited to the dimension d≤s−c and the dimension c is an axial width of a diameter of section of the housing inner lateral surface which widens towards the rotary vane between the cylindrical section thereof and the opening of the housing recess facing the rotary vane.

3. The coolant regulator according to claim 1, wherein the axial stop is a part of the rotary vane.

4. The coolant regulator according to claim 3, wherein the axial stop is formed by projections circumferentially distributed on the rotary vane.

5. A coolant regulator comprising:
a housing having a coolant chamber;
a rotary vane arranged in the coolant chamber;
a drive shaft leading out of the coolant chamber and configured to rotate the rotary vane;

a shaft seal rotationally fixed relative to the housing and which seals the coolant chamber from surroundings of the coolant regulator;

the shaft seal being inserted so as to seal against a housing inner lateral surface of a housing recess and sealingly enclosing the drive shaft;

the shaft seal having a U-shaped cross-section facing the rotary vane, a first radially outer end portion of the U-shaped cross-section comprising a circular ring having a bead-shaped cross-section, said circular ring, under elastic deformation of the bead, seals an outer circumference with the housing inner lateral surface and encompasses a spreading ring on an inner circumference; and said spreading ring, in order to limit an axial shift of the shaft seal directed toward the rotary vane is located opposite to an axial stop which limits the axial shift of the shaft seal to a dimension $d<s$, wherein the dimension s is an axial distance between a bead center of the shaft seal in an undisplaced condition and an opening of the housing recess facing the rotary vane.

6. The coolant regulator according to claim 5, wherein the housing inner lateral surface has a cylindrical section, and the axial shift of the shaft seal is limited to the dimension $d<s-c$ and the dimension c is an axial width of a diameter of section of the housing inner lateral surface which widens towards the rotary vane between the cylindrical section thereof and the opening of the housing recess facing the rotary vane.

7. The coolant regulator according to claim 5, wherein the axial stop is a part of the rotary vane.

8. The coolant regulator according to claim 7, wherein the axial stop is formed by projections circumferentially distributed on the rotary vane.

9. The coolant regulator according to claim 5, wherein the U-shaped cross-section facing the rotary vane includes a second radially inner end portion that includes a sealing lip that sealingly contacts the drive shaft.

10. The coolant regulator according to claim 9, wherein the shaft seal includes a second sealing lip that sealingly contacts the drive shaft.

* * * * *